United States Patent
Zhang et al.

(10) Patent No.: US 9,503,364 B2
(45) Date of Patent: Nov. 22, 2016

(54) LABEL SWITCHING PATH CALCULATION METHOD AND LABEL SWITCHING PATH CALCULATION DEVICE

(71) Applicant: Huawei Technologies Co., Ltd., Shenzhen (CN)

(72) Inventors: Li Zhang, Shenzhen (CN); Weifeng Li, Shenzhen (CN); Ruichuan You, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 14/661,309

(22) Filed: Mar. 18, 2015

(65) Prior Publication Data
US 2015/0195195 A1 Jul. 9, 2015

Related U.S. Application Data

(63) Continuation of application No. PCT/CN2013/075610, filed on May 14, 2013.

(30) Foreign Application Priority Data

Sep. 21, 2012 (CN) .......................... 2012 1 0360623

(51) Int. Cl.
*H04L 12/28* (2006.01)
*H04L 12/723* (2013.01)
*H04L 12/721* (2013.01)

(52) U.S. Cl.
CPC ............. *H04L 45/507* (2013.01); *H04L 45/12* (2013.01); *H04L 45/32* (2013.01); *H04L 45/50* (2013.01)

(58) Field of Classification Search
CPC ..... H04L 45/507; H04L 45/50; H04L 45/32; H04L 45/44; H04L 49/11
See application file for complete search history.

(56) References Cited

U.S. PATENT DOCUMENTS

2005/0141504 A1 6/2005 Rembert et al.
2008/0002664 A1 1/2008 Li et al.
(Continued)

FOREIGN PATENT DOCUMENTS

CN 1816000 A 8/2006
CN 101083548 A 12/2007
(Continued)

OTHER PUBLICATIONS

Awduche et al., "RSVP-TE: Extensions to RSVP for LSP Tunnels," Network Working Group, Request for Comments: 3209, pp. 1-61, Internet Society, Reston, Virginia (Dec. 2001).
(Continued)

*Primary Examiner* — Chi H Pham
*Assistant Examiner* — Alexander O Boakye
(74) *Attorney, Agent, or Firm* — Leydig, Voit & Mayer, Ltd.

(57) ABSTRACT

Embodiments of the present application provide a label switching path calculation method and a label switching path calculation device. In the method, by performing hierarchical level and domain value planning on a node in a network in advance, when an LSP is calculated, hierarchical domain information about each node is acquired, and the LSP is calculated using the acquired hierarchical domain information about each node. Since the hierarchical domain information about each node designates a network position where the node is located, it can be avoided that an LSP obtained by calculation reroutes an access layer according to the hierarchical domain information about each node and a satisfaction criterion for the LSP during the LSP calculation process. In addition, the technical solution provided in the embodiments of the present application needs no manual intervention in the whole LSP calculation process, realizing the automatic calculation of an LSP.

12 Claims, 4 Drawing Sheets

(56) References Cited

U.S. PATENT DOCUMENTS

2015/0195195 A1* 7/2015 Zhang ............... H04L 45/50
  370/400
2015/0295820 A1* 10/2015 Tang ................ H04L 45/50
  370/351

FOREIGN PATENT DOCUMENTS

| CN | 102347893 A | 2/2012 |
|---|---|---|
| CN | 102684985 A | 9/2012 |
| CN | 102904810 A | 1/2013 |
| EP | 1863235 A1 | 12/2007 |
| GB | 2440287 A | 1/2008 |

OTHER PUBLICATIONS

Katz et al., "Traffic Engineering (TE) Extensions to OSPF Version 2," Network Working Group, Request for Comments: 3630, pp. 1-14, Internet Society, Reston, Virginia (Sep. 2003).

Kompella et al., "Intermediate System to Intermediate System (IS-IS) Extensions in Support of Generalized Multi-Protocol Label Switching (GMPLS)," Network Working Group, Request for Comments: 4205, pp. 1-11, Internet Society, Reston, Virginia (Oct. 2005).

Martini et al., "Pseudowire Setup and Maintenance Using the Label Distribution Protocol (LDP)," Network Working Group, Request for Comments: 4447, pp. 1-33, Internet Society, Reston, Virginia (Apr. 2006).

Lee et al., "Exclude Routes—Extension to Resource ReserVation Protocol-Traffic Engineering (RSVP-TE)," Network Working Group, Request for Comments: 4874, pp. 1-27, Internet Society, Reston, Virginia (Apr. 2007).

Lindem et al., "Extensions to OSPF for Advertising Optional Router Capabilities," Network Working Group, Request for Comments: 4970, pp. 1-13, Internet Society, Reston, Virginia (Jul. 2007).

Vasseur et al., "Intermediate System to Intermediate System (IS-IS) Extensions for Advertising Router Information," Network Working Group, Request for Comments: 4971, pp. 1-9, Internet Society, Reston, Virginia (Jul. 2007).

Li et al., "IS-IS Extensions for Traffic Engineering," Network Working Group, Request for Comments: 5305, pp. 1-17, Internet Society, Reston, Virginia (Oct. 2008).

Li et al., "OSPF Extensions for Automatic Computation of MPLS Traffic Engineering Path Using Traffic Engineering Layers and Areas," Network Working Group, Internet Draft, pp. 1-13, Internet Society, Reston, Virginia (Feb. 18, 2013).

Li et al., "OSPF Extensions for Automatic Computation of MPLS Traffic Engineering Path Using Traffic Engineering Layers and Areas," Slides 1-8, IETF 86, Orlando, Florida, Internet Society, Reston, Virginia (Mar. 10-15, 2013).

* cited by examiner

LABEL SWITCHING PATH CALCULATION METHOD AND LABEL SWITCHING PATH CALCULATION DEVICE

CROSS-REFERENCE TO RELATED APPLICATIONS

This application is a continuation of International Patent Application No. PCT/CN2013/075610, filed May 14, 2013, which claims priority to Chinese Patent Application No. 201210360623.0, filed Sep. 21, 2012, both of which are hereby incorporated by reference in their entireties.

TECHNICAL FIELD

The present application relates to the technical field of communication, and in particular to a method and device for calculating a label switching path (LSP, Label Switching Path).

BACKGROUND

Internet protocol radio access network (IP RAN) is an existing main solution in mobile carrier network technology. Based on a design concept of flexible IP communication, a bearer path is planed by means of static routing manually configured by a network administrator, and a received signal quality is guaranteed by incorporating traffic engineering (TE) channel technology with hierarchical Quality of Service (QoS). In the IP RAN solution, considering a high reliability of telecommunication service required by telecommunication standard, a virtual private network (VPN) (including a layer 2 VPN and a layer 3 VPN, i.e., L2VPN and L3VPN) is commonly carried by a public-network TE tunnel. The IP RAN is a network converged layer by layer, and a network architecture thereof includes an access layer, a convergence layer and a kernel layer.

In multi-protocol label switch traffic engineering (MPLS TE), advantages of multi-protocol label switch (MPLS) and the TE are combined to implement a dynamical adjustment of network bandwidth resources and an optimization of the distribution, thus solving the network congestion. In the MPLS TE, a topology calculation is performed based on the link status, and a LSP is created. In the IP RAN, the bandwidth of the access layer is different from that of the convergence layer, and the service planning carrying capacity of the access layer is different from that the convergence layer. A convergence layer may provide a service to each access layer, and the access layer may not carry a traffic redundancy. Thus, in the IP RAN, the LSP may be calculated to avoid passing through other access areas of the access layer. In addition, another requirement of the IP RAN is to provide a main-standby path protection. In a desirable condition, the main and standby LSPs are completely separated, i.e., no common channel exists between the main and the standby LSPs. The complete separation of the main and standby LSPs includes the separation of the links, and the separation of nodes. In this way, it may be guaranteed that the status of standby LSP may not be affected by a failure at any link or node in the main LSP.

At present, the LSP is affected by explicit paths of the TE. It may be guaranteed that the LSP may not pass the access layer by allocating aggregation nodes to connect with the node and link directing to the convergence layer. Alternatively, a key node, where the main and the standby paths may intersect, may be allocated to the main path or the standby path, to ensure the separation of the main and standby LSPs. Thus, by affecting the LSP by the explicit paths of the TE, the LSP may be avoided from passing the access layer, and the main and the standby paths may be separated. However, the explicit paths of the TE need a manual intervention on the attribute description of the TE channel, and thus it is difficult to implement an automatic calculation.

SUMMARY

In view of this, a method and device for calculating a LSP are provided to realize an automatic calculation of the LSP on condition that the LSP is avoided from passing the access layer.

To solve the foregoing technical problems, a technical solution is provided as follows.

In the first aspect, a method for calculating a LSP is provided according to an embodiment of the application. The method includes:

acquiring layer domain information of nodes in an autonomous system where a source node in a network is located, where the layer domain information of each node comprises information of a layer rank of the node and information of a domain value of the node, where in the network, each node has a layer rank and at least one domain value, where nodes in one network layer have a same layer rank, and a node in a low level of the network layer has a higher layer rank than that in a high level of the network layer, where the domain value is configured to indicate a network physical coverage area of the node, all nodes within one network physical coverage area have a same domain value, and nodes in different network physical coverage areas have different domain values;

when a destination node and the source node are in a same autonomous system, calculating a LSP from the source node to the destination node based on the layer domain information of the each node, to create the LSP based on the calculated LSP; where the calculating the LSP from the source node to the destination node includes: when there is a first kind of path or a second kind of path in the process of the calculation of the LSP, prioritizing to exclude the two kinds of path, wherein nodes in the first kind of path have layer ranks from high to low to high, and nodes in the second kind of path have layer ranks from low to high to low; when a currently calculated node is in an overlapping area of multiple network physical coverage areas in the process of the calculation of the LSP, prioritizing to determine a node in a network physical coverage area where a previous calculated node is not located, as a next hop node of the currently calculated node.

In combination with the first aspect of the application, in a first implementation, the method for calculating the LSP further includes:

when the destination node and the source node are in different autonomous systems, before the calculating a LSP from the source node to the destination node based on the layer domain information of the nodes, acquiring the layer domain information of the destination node;

calculating the LSP from the source node to the destination node based on the layer domain information of each node and the layer domain information of the destination node;

where the calculating the LSP from the source node to the destination node based on the layer domain information of the each node and the layer domain information of the destination node includes:

calculating a first section from the source node to an intermediate node in the LSP based on the layer domain information of each node, where the intermediate node is located in an overlapping area of an autonomous system where the source node is located and an autonomous system where the destination node is located;

sending to the intermediate node, the layer domain information of the destination node and the layer domain information of nodes in the first section of the LSP, where the intermediate node calculates a second section from the intermediate node to the destination node in the LSP based on the layer domain information of the destination node and the layer domain information of nodes in the first section of the LSP;

acquiring, from the intermediate node, indication information of the second section of the LSP, where the indication information of the second section of the LSP includes the layer domain information of nodes in the second section of the LSP; and combining the first section and the second section of the LSP, based on the first section of the LSP and the indication information of the second sections of the LSP, to obtain the LSP from the source node to the destination node.

In combination with the first implementation of the first aspect of the application, in a second implementation, the acquiring the layer domain information of the destination node includes:

acquiring the layer domain information of the destination node via a received label distribution protocol LDP message or a received border gateway protocol BGP message.

In combination with the first or second implementation of the first aspect of the application, in a third implementation, the sending to the intermediate node, the layer domain information of the destination node and the layer domain information of nodes in the first section of the LSP includes:

sending to the intermediate node, via an extended resource reservation protocol-traffic engineering message, the layer domain information of the destination node and layer domain information of nodes in the first section of the LSP;

where the acquiring, from the intermediate node, indication information of the second section of LSP includes:

acquiring the indication information of the second section of LSP from the extended resource reservation protocol-traffic engineering message returned by the intermediate node.

In combination with the first aspect of the application, or the first, second, or third implementation of the first aspect of the application, in a fourth implementation, the acquiring layer domain information of all nodes in an autonomous system where a source node in a network is located includes:

acquiring the layer domain information of the each node via an intermediate system to intermediate system protocol message flooded by the each node in the autonomous system where the source node in the network is located; or acquiring the layer domain information of the each node, via an open shortest path first protocol message flooded by the each node in the autonomous system where the source node in the network is located.

In combination with the first aspect of the application, or the first, second, third or fourth implementation of the first aspect of the application, in a fifth implementation, after the calculating the LSP from the source node to the destination node, the method further includes:

when there are at least two LSPs, the method may include:
selecting, from the at least two LSPs, a LSP which passes the fewest network layers;

determining the LSP which passes the fewest network layers as an optimal LSP from the source node to the destination node, when there is one selected LSP which passes the fewest network layers;

when there is more than one selected LSP which passes the fewest network layers, the method may include:

comparing, based on an ascending order of the levels of the network layers, the number of the nodes of the LSPs at each network layer, where the LSPs pass the fewest network layers;

determining the LSP which passes the fewest nodes in one network layer as a main LSP from the source node to the destination node.

In the second aspect, a device for calculating a LSP is provided according to an embodiment of the application. The device includes:

an acquisition unit configured to acquire layer domain information of nodes in an autonomous system where a source node in a network is located, where the layer domain information of each node includes information of a layer rank of the node and information of a domain value of the node, where in the network, each node has a layer rank and at least one domain value, where nodes in one network layer have a same layer rank, and a node in a low level of the network layer has a higher layer rank than that in a high level of the network layer, where nodes within one network physical coverage area have a same domain value, and nodes in different network physical coverage areas have different domain values;

a calculating unit configured to calculate a LSP from the source node to a destination node based on the layer domain information of each node acquired by the acquisition unit, to create the LSP based on the calculated LSP, when the destination node and the source node are in a same autonomous system, where the calculating the LSP from the source node to the destination node includes: when there is a first kind of path or a second kind of path in the process of the calculation of the LSP, prioritizing to exclude the two kinds of path, where nodes in the first kind of path have the layer ranks from high to low to high, and nodes in the second kind of path have the layer ranks from low to high to low; when a currently calculated nod is in an overlapping area of multiple network physical coverage areas in the process of calculating the LSP, prioritizing to determine a node in a network physical coverage area where a previous calculated node is not located, as a next hop node of the currently calculated node.

In combination with the second aspect of the application, in a first implementation, the acquisition unit is further configured to acquire the layer domain information of the destination node.

The calculating unit includes:

a calculating sub-unit configured to calculate a first section from the source node to an intermediate node in the LSP based on the layer domain information of the each node acquired by the acquisition unit, where the intermediate node is located in an overlapping area of the autonomous system where the source node is located and the autonomous system where the destination node is located;

a sending unit configured to send to the intermediate node, the layer domain information of the destination node acquired by the acquisition unit and the layer domain information of nodes in the first section of the LSP; where the intermediate node calculates a second section of the LSP from the intermediate node to the destination node based on the layer domain information of the destination node and the layer domain information of nodes in the first section of the LSP;

an acquisition sub-unit configured to acquire, from the intermediate node, indication information of the second section of the LSP, where the indication information of the second section of the LSP includes the layer domain information of nodes in the second section of the LSP;

a combining unit configured to combine the first section and the second section of the LSP, based on the indication information of the second section of the LSP acquired by the acquisition sub-unit and the first section of the LSP calculated by the calculating sub-unit.

In combination with the first implementation of the first aspect of the application, in a second implementation, the acquisition unit is configured to acquire the layer domain information of the destination node from a received label distribution protocol LDP message or a received border gateway protocol BGP message.

In combination with the first or second implementation of the first aspect of the application, in a third implementation, the sending unit is configured to send to the intermediate node, via an extended resource reservation protocol-traffic engineering message, the layer domain information of the destination node acquired by the acquisition unit and layer domain information of the nodes in the first section of the LSP;

the acquisition unit is configured to acquire the indication information of the second section of LSP from the extended resource reservation protocol-traffic engineering message returned by the intermediate node.

In combination with the first aspect of the application, or the first, second, or third implementation of the first aspect of the application, in a fourth implementation, the acquisition unit is configured to acquiring the layer domain information of the each node from an intermediate system to intermediate system protocol message flooded by the each node in the autonomous system where the source node in the network is located; or the acquisition unit is configured to acquire the layer domain information of the nodes from an open shortest path first protocol message flooded by nodes in the autonomous system where the source node in the network is located.

In combination with the first aspect of the application, or the first, second, third or fourth implementation of the first aspect of the application, in a fifth implementation, the device for calculating the LSP further includes:

a selecting unit configured to, when there are at least two LSPs, select a LSP which passes the fewest network layers, from the at least two LSPs;

an optimal path determining unit configured to determine the LSP which passes the fewest network layers as an optimal LSP from the source node to the destination node, when there is one selected LSP which passes the fewest network layers; or when there are more than one selected LSP which passes the fewest network layers, compare, based on an ascending order of the levels of the network layers, the numbers of the nodes of the LSPs in each network layer, where the LSPs pass the fewest network layers; and determine the LSP which passes the fewest nodes in one network layer as a main LSP from the source node to the destination node.

In general, by planning the layer ranks and the domain values of the nodes in the network, the LSP may be calculated based on the acquired layer domain information of the nodes. Because the layer domain information of a node indicate the position of the node in the network, the LSP may be calculated based on the layer domain information of the nodes and the rule with which the LSP should comply, thereby avoiding the calculated LSP from passing the access layer. In the technical solution provided by the application, the LSP may be calculated without manual intervention, thereby realizing the automatic calculation of the LSP.

BRIEF DESCRIPTION OF THE DRAWINGS

To make the solutions and embodiments provided by the disclosure better understood by those skilled in the art, the drawings used in the disclosure will be briefly described in the following. Obviously, the drawings described in the following are only a few of the embodiments of the disclosure, and those skilled in the art may obtain other drawings according to these drawings without creative work.

DETAILED DESCRIPTION OF EMBODIMENTS

A method and device for calculating a LSP are provided according to embodiments of the application.

To make the objective, features and advantages better understood by those skilled in the art, the technical solution in the embodiments of the application will be specified in the following in conjunction with drawings. Obviously, the embodiments described in the following are only a few of embodiments of the disclosure, and those skilled in the art may obtain other embodiments according to these embodiments without creatively work.

Figure 1A:
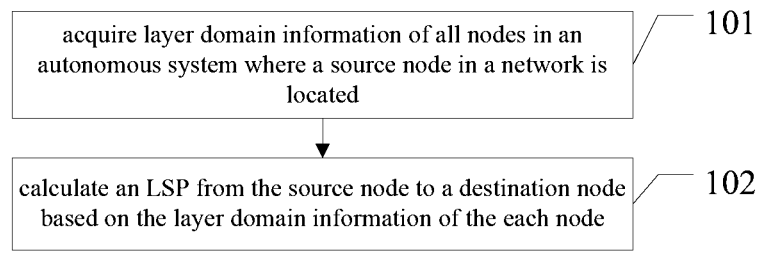
FIG. 1A is a flow chart of a method for calculating a LSP based on a layer and a domain of each node according to an embodiment of the application.

A method for calculating a LSP based on a layer and a domain of each node is provided according to an embodiment of the application. In an embodiment of the application, a source node and a destination node are within the same autonomous system (i.e., the resource node and the destination node are in the same domain). Referring to FIG. 1A, embodiment of the present application provide a method for calculating a LSP, where the method includes:

101. Acquire layer domain information of all nodes in an autonomous system where a source node in a network is located.

The device for calculating the LSP acquires the layer domain information of all nodes in the autonomous system where the source node in the network is located. The layer domain information of each node includes: information of a layer rank of the node and information of a domain value of the node. In the network, each node is provided with a layer rank and at least one domain value. The nodes in one network layer have a same layer rank. The lower the level of the network layer where the node is located, the higher the layer rank of the node may be. All nodes within one network physical coverage area have a same domain value, and nodes in different network physical coverage areas have different domain values.

In an embodiment of the application, the autonomous system refers to a set of routers and network groups which are controlled by an administrative apparatus.

Figure 1B:
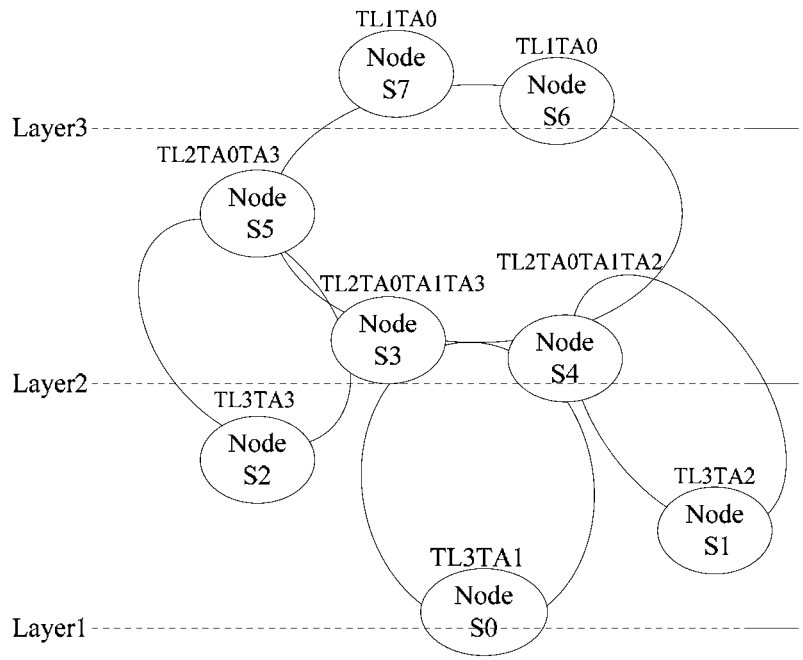
FIG. 1B is a structure schematic diagram of an application scenario of a layer domain configuration of nodes according to an embodiment of the application.

In a network planning, a layer domain parameter is allocated for each node based on the network layer of the node and the network physical coverage area where the node is located. In practical application, a network layer (e.g., an access layer) may be divided into one or more network physical coverage areas. The network physical coverage area is divided by a network operator based on the number of users accessed to the network, a physical coverage area and an intensity of user services, which has a uniform transmission link and implements the same service. From a perspective of network level, the network physical coverage area may include a core area, a convergence area and an access area. In one network level, traffic loads between different network coverage areas may be isolated. The network physical coverage area has not a determined requirement for a topology of physical networking, and thus a ring topology or other complex topologies may be available. In an embodiment of the application, a rule of configuring the layer rank includes the follows. 1. Each node may belong to only one layer rank, i.e., each node has a unique layer rank. 2. The lower the level of the network where the node is located, the higher the layer rank of the node may be. For example, in a network including a core layer, a convergence layer and an access layer, the levels of the network layer are the core layer, the convergence layer and the access layer in an order from a top to a bottom of the network layer, hence the layer rank of the node in the core layer is lower than that of the node in the access layer. 3. The nodes in one network layer have the same layer rank. For example, the nodes in the access layer have the same layer rank. The rule of configuring a domain value includes the follows. Different domain values are allocated to different network physical coverage areas, such that the network physical coverage area corresponds to the domain value one by one. Thus, it is guaranteed that the nodes within one network physical coverage area have the same domain value and the nodes in different network physical coverage areas have different domain values. Multiple domain values are allocated to the nodes which are located within an overlapping area of multiple network physical coverage areas. For example, if a node is located within an overlapping area of network physical coverage area 1 and network physical coverage area 2, two domain values, i.e., the domain value corresponded to the network physical coverage area 1 and the domain value corresponded to the network physical coverage area 2, may be allocated to the node. FIG. 1B is a schematic diagram of a layer domain configuration of the nodes S0-S7 in a three-layer ring network including Layer 1, Layer 2 and Layer 3. In FIG. 1B, each network ring represents a network physical coverage area, and the level of the network layer includes Layer 3, Layer 2 and Layer 1 in an order from top to bottom. "TL" and "TA" represents a layer rank and a domain value respectively, and $TL1<TL2<TL3$. As shown in FIG. 1B, the nodes in Layer 3 are allocated with the layer rank of TL1, the nodes in Layer 2 are allocated with the layer rank of TL2, and the node in Layer 1 are allocated with the layer rank of TL3. The domain values of the four network physical coverage areas are TA0, TA1, TA2 and TA3 respectively. The node which is located within an overlapping area of multiple network physical coverage areas is allocated with multiple domain values.

In practical application, after being allocated with layer ranks and domain values, the nodes in the network may flood their local layer domain information in their autonomous system. Thus, each node in its autonomous system may learn the layer domain information of other nodes, where the layer domain information includes the foregoing layer ranks and domain values. In an embodiment of the application, the device for calculating the LSP and the source node are located in the same autonomous system (for the convenience of description, the autonomous system including the device for calculating the LSP and the source node is called a source area). Thus, the device for calculating the LSP may acquire the layer domain information flooded by the each node in the source area. Furthermore, after acquiring the layer domain information flooded by the each node in the source area, the device for calculating the LSP may generate a path database including the layer domain information of all nodes in the source area, to conveniently call the layer domain information in the process of the creation of the LSP. In an application scenario, intermediate system-to-intermediate system (ISIS) protocol and open shortest path first (OSPF) protocol may be extended as needed. For example, for ISIS protocol, the layer domain information may be transmitted by means of extending sub-TLVs of a CAPABILITY TLV presented in a request for comments (RFC) 4971 (the TLV herein refers to a variable format including three fields of type, length and value). For OSPF protocol, the layer domain information may be transmitted by means of extending a TLV in a Router Information (RI) Opaque LSA presented in the RFC 4971. In this way, the device for calculating the LSP may acquire the layer domain information of all nodes in the source area, via an ISIS protocol message or an OSPF protocol message flooded by the nodes in the source area in the network.

102. Calculate a LSP from the source node to a destination node based on the layer domain information of the each node, to create the LSP based on the calculated LSP, when the destination node and the source node are in the same autonomous system.

In an embodiment of the application, the destination node and the source node are in the same autonomous system. Thus, in step 101, the layer domain information of the nodes in the source area acquired by the device for calculating LSP may further include the layer domain information of the destination node. After calculating the LSP from the source node to the destination node based on the layer domain information of the nodes, the device for calculating the LSP may create the LSP based on the calculated extended resource reservation protocol-traffic engineering (RSVP-TE) or other protocols. Taking the creation of the LSP based on the RSVP protocol for example, after the LSP from the source node to the destination node is calculated, a head node (i.e., the source node) of the LSP may send a path message to other nodes of the LSP hop by hop, to require the nodes in the path to reserve label resources for the LSP. After the path message arrives the destination node, the destination node may return a resv message to the nodes in the path hop by hop to allocate the label for the LSP, and then the LSP from the head node to the destination node is created, i.e., the LSP is created.

The device for calculating the LSP may calculate the LSP from the source node to the destination node based on two rules. a. If there is a first kind of path or a second kind of path in the process of the calculation of the LSP, the two kinds of path may be prioritized to be excluded, where the nodes in the first kind of path have the layer ranks from high to low to high, and the nodes in the second kind of path have the layer ranks from low to high to low. b. In the process of the calculation of the LSP, when the currently calculated node is located in an overlapping area of multiple network physical coverage areas, a node in a network physical coverage area where a previous calculated node of the LSP is not located may be prioritized to be determined to be a next hop node of the currently calculated node.

The process of calculating, by the device for calculating the LSP, the LSP from the source node to the destination node may be illustrated in the following. In the schematic diagram of a configuration of a layer domain parameter shown in FIG. 1B, there are three network layers, i.e., Layer 1, Layer 2 and Layer 3, in which the levels of the network layers is Layer3>Layer2>Layer1. Thus, based on the rule of configuring the layer domain parameter described in the step 101, the layer rank of the nodes in Layer 3 may be preset to be TL1, the layer rank of the nodes in Layer 2 may be preset to be TL2, and the layer rank of the nodes in Layer 1 may be preset to be TL3, where TL1<TL2<TL3. Assuming that the four rings in FIG. 1B represent respectively four network physical coverage areas which correspond respectively to the four domain values of TA0, TA1, TA2 and TA3, the layer domain parameters of nodes S0-S7 in FIG. 1B may be preset. The nodes in one network physical coverage area may be allocated with the domain value of the network physical coverage area. A node (e.g., nodes S3, S4 and S5 in FIG. 1B), which is located in an overlapping area of multiple network physical coverage areas, may be allocated with the domain values of the multiple network physical coverage areas. For the convenience of understanding, the layer ranks and the domain values allocated to the respective nodes S0-S7 are marked above the nodes. It may be noted that the values marked above the nodes are only to help understanding the subsequent description, rather than to define a format of the layer domain information of the nodes in the embodiment of the application. Based on the schematic diagram of the layer domain configuration of the nodes shown in FIG. 1B, when a LSP from a node S0 to a node S7 is created, the device for calculating the LSP may calculate the LSP from the node S0 to the node S7 based on the set forth rules a and b. Because the node S0 is in TL3 (i.e., the layer rank of node S0 is TL3) and node S7 is in TL1, the calculation may be performed on the nodes with a low layer rank, and thus the exits are node S3 and node S4. Assuming that the calculation is performed on the node S3, the calculation may return to the node in TL2 if the next exit is a node in TL3, i.e., there is a second kind of path. Based on the foregoing rule a, the node directing to the node in TL3 is prioritized to be excluded, thereby avoiding the LSP from passing the physical network coverage area of Layer 3. Because the path from node S0 to node S3 passes a network ring with a domain value of TA1, and the node S4 is also in a network ring with a domain value of TA1, the node S5 may be selected, from the nodes S4 and S5, as a next hop node for node S3 based on the foregoing rule b. Next, based on the rule a, the path may not pass other network physical coverage area of Layer 3, thus the calculation may only be performed on the node S7, and then the LSP from node S0 to node S7 is calculated, i.e., S0→S3→S5→S7.

In practical application, a standby LSP is created to realize an end-to-end protection. In an optimal main and standby protection solution, the main LSP is completely separated from the standby LSP. The complete separation of the main and standby LSPs includes the separation of the links, and the separation of nodes. In this way, it may be guaranteed that the status of the standby LSP may not be affected by a failure at any link or node in the main LSP, thereby implementing the end-to-end protection in the real sense.

In an embodiment, if there are multiple calculated LSPs from the source node to the destination node, the device for calculating the LSP may select an optimal LSP from the multiple calculated LSPs as the main LSP, and take the rest LSP as the standby LSP. The method of determining the optimal LSP from the multiple LSPs may include: selecting, from the more than two LSPs, a LSP which passes the fewest network layers. If there is only one selected LSP which passes the fewest network layers, the only LSP may be selected as an optimal LSP from the source node to the destination node. If there is more than one selected LSP which passes the fewest network layers, the numbers of the nodes of the multiple LSPs in each network layer may be compared based on an ascending order of the levels of the network layers, where the multiple LSPs pass the fewest network layers; and then the LSP which passes the fewest nodes in one network layer may be determined to be the main LSP from the source node to the destination node. For example, as shown in FIG. 1B, based on the foregoing rules a and b, another LSP: S0→S4→S6→S7 (for the convenience of description, referred to path L2) may be obtained, besides the LSP: S0→S3→S5→S7 (for the convenience of description, referred to path L1). Firstly, the number of the network layers of the path L1 is compared with that of the path L2. Because paths L1 and L2 pass the same number of the network layers, firstly the number of the nodes of the path L1 in Layer 1 is compared with that of the path L2 in Layer 1. As shown in FIG. 1B, both path L1 and path L2 include only the node S0, in Layer 1. Then, the number of the nodes of the path L1 in Layer 2 may be compared with that of the path L2 in Layer 2. In Layer 2, path L1 passes nodes S3 and S5, and path L2 only passes node S4. Thus, the LSP which passes the fewer nodes in one network layer may be selected as the main LSP from node S0 to node S8, i.e., the path L2 may be selected as the main LSP from the node S0 to the node S7, and the path L1 may be selected as the standby LSP from node S0 to node S7. In addition, the device for calculating the LSP may also determine a main LSP from multiple LSPs in other manners. For example, the device for calculating the LSP may also compare, based on a descending order of the levels of the network layers, the numbers of the nodes of the LSPs in each network layer, where the LSPs pass the fewest network layers; and then determine the LSP which passes the fewest nodes at one network layer, as the main LSP. Alternatively, the device for calculating the LSP may determine the main LSP from the multiple calculated LSPs based on the traffic of the nodes of the LSPs. Alternatively, the device for calculating the LSP may select a LSP randomly as the main LSP, which will not be limited herein.

In an embodiment of the application, the device for calculating the LSP may further be integrated into the source node or be independent to the source node, which will not be limited herein.

It may be noted that, the technical solution provided in the application may be applied to IP RAN network or other networks, the network may be a ring network or other kinds of network in a networking mode, which will not be limited herein.

In an embodiment of the application, by planning the layer ranks and the domain values of the nodes in the network, the LSP may be calculated based on the acquired layer domain information of the nodes. Because the layer domain information of a node indicate the position of the node in the network, the LSP may be calculated based on the layer domain information of the nodes and the rule with which the LSP should comply, thereby avoiding the calculated LSP from passing the access layer. In the technical solution provided by the application, the LSP may be calculated without manual intervention, thereby implementing an automatic calculation of the LSP. In addition, the LSPs calculated based on the foregoing rules are separated completely. Thus, when the main and standby LSPs are created by use of the foregoing multiple LSPs, it may be guaranteed that the status of the standby LSP may not be affected by a failure at any link or node in the main LSP, thereby implementing the end-to-end protection in the real sense.

Figure 2:
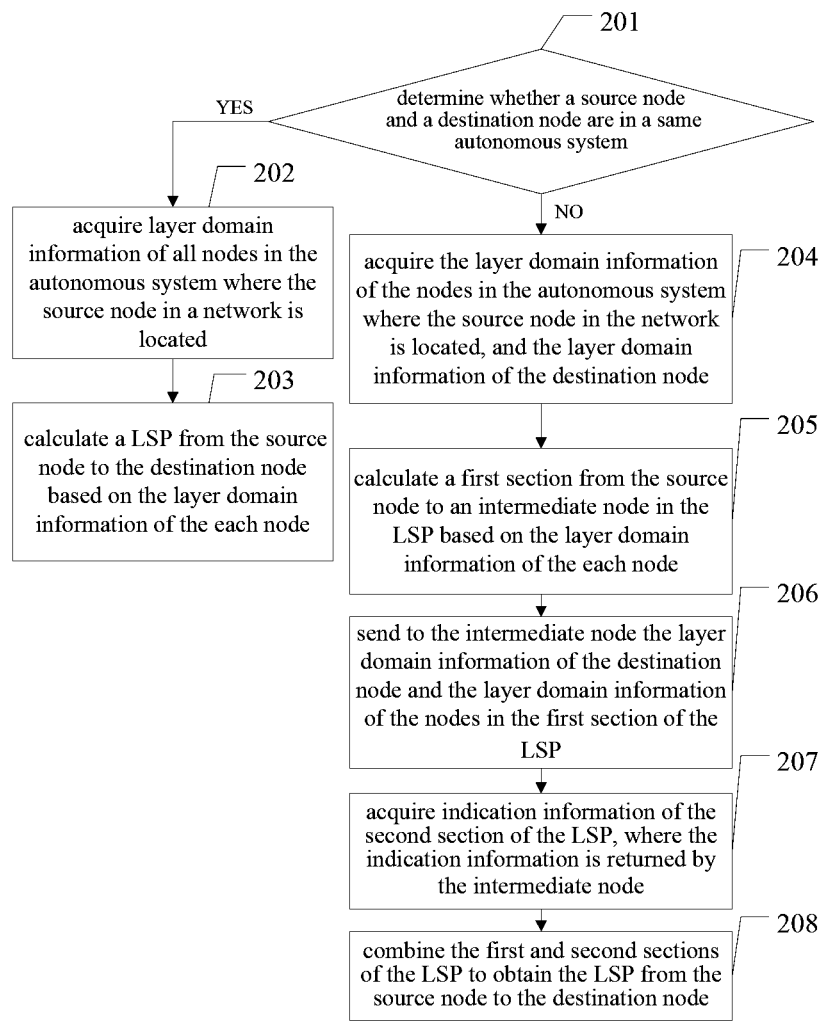
FIG. 2 is a flow chart of a method for calculating a LSP based on a layer and a domain of each node according to another embodiment of the application.

In the method for calculating the LSP based on a layer and a domain of each node, the source node and the destination node are required to be in the same domain. Another method for calculating a LSP is provided according to an embodiment of the application, in which the source node and the destination node are in different domains. Referring to FIG. 2, embodiment of the present application provides a method for calculating a LSP based on a layer and a domain of each node, where the method includes:

201. Determine whether a source node and a destination node are in a same autonomous system.

In an embodiment of the application, a device for calculating the LSP may determine whether the source node and the destination node are in the same autonomous systems based on address information of the source node and address information of the destination node, or other identification information. If the source and the destination nodes are in the same autonomous system, Step 202 may be performed; and Step 204 may be performed if the source and the destination nodes are in different autonomous systems.

202. Acquire layer domain information of all nodes in the autonomous system where the source node in a network is located.

The description of the Step 101 in the embodiment shown in FIG. 1A may provide a reference for Step 202, the detailed description of which will be omitted herein.

203. Calculate a LSP from the source node to the destination node based on the layer domain information of the each node.

The description of the Step 102 in the embodiment shown in FIG. 1A may provide a reference for Step 203, the detailed description of which will be omitted herein.

204. Acquire the layer domain information of the nodes in the autonomous system where the source node in the network is located, and the layer domain information of the destination node.

The description of the Step 101 in the embodiment shown in FIG. 1A may provide a reference for the process of acquiring the layer domain information of the nodes in the autonomous system where the source node in the network is located, the detailed description of which will be omitted herein.

Regarding the acquisition of the layer domain information of the destination node, the device for calculating the LSP may not acquire the layer domain information of the destination node by means of flooding the layer domain information of the nodes, because the autonomous system has the TE information isolated from the other autonomous system. In an implementation, a business layer protocol may be applicable to transmit the layer domain information of the destination node. At present, a layer 2 VPN business or a layer 3 VPN business is common. Business information of the layer 2 VPN business or the layer 3 VPN business is transmitted respectively via label distributed protocol (LDP) and border gateway protocol (BGP). Therefore, the device for calculating the LSP in the embodiment may receive the layer domain information of the destination node carried by an extended LDP message or an extended BGP message.

205. Calculate a first section from the source node to an intermediate node in the LSP based on the layer domain information of the each node.

The intermediate node is located in an overlapping area of the autonomous system areas where the source and the destination nodes are located respectively. The description of the Step 102 in the embodiment shown in Figure 1A may provide a reference for a rule complied in the process of calculating, by the device for calculating the LSP, the first section from the source node to the intermediate node in the LSP, detailed description of which will be omitted herein.

206. Send to the intermediate node the layer domain information of the destination node and the layer domain information of nodes in the first section of the LSP.

The device for calculating the LSP sends to the intermediate node the layer domain information of the destination node and the layer domain information of nodes in the first section of the LSP. The intermediate node may calculate a second section from the intermediate node to the destination node in the LSP based on the acquired layer domain information of the destination node and the layer domain information of the nodes in the first section of the LSP. The description of the Step 102 in the embodiment shown in Figure 1A may provide a reference for a rule complied in the process of calculating, by the device for calculating the LSP, the second section from the intermediate node to the destination node in the LSP, the detailed description of which will be omitted herein.

In an implementation, the device for calculating the LSP may send to the intermediate node, the acquired layer domain information of the destination node and the layer domain information of nodes in the first section of the LSP, via an extended resource reservation protocol-traffic engineering (RSVP-TE) message. For example, the acquired layer domain information of the destination node and layer domain information of nodes in the first section of the LSP may be transmitted, by means of extending a kind of subobject based on Session Object and Record Route Object defined in RFC3029.

207. Acquire indication information of the second section of the LSP, where the indication information is returned by the intermediate node.

The device for calculating the LSP acquires the indication information of the second section of the LSP, which is returned by the intermediate node. The indication information of the second section of the LSP includes the layer domain information of the nodes in the second section of the LSP.

In an implementation, the intermediate node may send the indication information of the path to the device for calculating the LSP via the extended RSVP-TE message, and then the device for calculating the LSP may acquire the indication information of the second section of LSP from the RSVP-TE message. For example, the intermediate node may transmit the indication information of the second section of LSP by means of extending a kind of subobject based on Session Object and Record Route Object defined in RFC3029.

208. Combine the first and second sections of the LSP to obtain the LSP from the source node to the destination node.

The device for calculating the LSP combines the first section of the LSP obtained in Step 205 and the second section of the LSP obtained in Step 207, to obtain the LSP from the source node to the destination node.

In an implementation, a standby LSP is created to realize an end-to-end protection. In an optimal main and standby protection solution, the main LSP is separated completely from the standby LSPs. The complete separation of the main and standby LSPs includes the separation of the links, and the separation of the nodes. In this way, it may be guaranteed that the status of the standby LSP may not be affected by a failure at any link or node in the main LSP, thereby realizing the end-to-end protection in the real sense.

In an implementation, if there are multiple calculated LSPs from the source node to the destination node, the device for calculating the LSP may select an optimal LSP from the multiple calculated LSPs to be the main LSP, and take the rest LSP as the standby LSP. The method of determining the optimal LSP from the multiple LSPs may include: selecting, from the more than two LSPs, a LSP which passes the fewest network layers. If there is only one selected LSP which passes the fewest network layers, the only LSP may be selected to be an optimal LSP from the source node to the destination node. If there is more than one selected LSPs which pass the fewest network layers, the numbers of the nodes of the multiple LSPs in each network layer may be compared based on an ascending order of the levels of the network layers, where the multiple LSPs pass the fewest network layers; and then the LSP which passes the fewest nodes in one network layer may be determined to be the main LSP from the source node to the destination node. In addition, the device for calculating the LSP may also determine a main LSP from multiple LSPs in other manners. For example, the device for calculating the LSP may further compare, based on a descending order of the levels of the network layers, the numbers of the nodes of the LSPs in each network layer, where the LSPs pass the fewest network layers; and then the LSP which passes the fewest nodes at one network layer may be determined to be the main LSP. Alternatively, the device for calculating the LSP may determine the main LSP from the multiple calculated LSPs based on the traffic of the nodes of the LSPs. Alternatively, the device for calculating the LSP may select a LSP randomly as the main LSP, which will not be limited herein.

In an embodiment of the application, the device for calculating the LSP may be integrated into the source node, or be independent to the source node, which will not be limited herein.

It may be noted that, the technical solution provided in the application may be applied to an IP RAN network or other networks, the network may be a ring network or other kinds of network in a networking mode, which will not be limited herein.

It may be seen that, in an embodiment of the application, by planning the layer ranks and the domain values of the nodes in the network, the LSP may be calculated based on the acquired layer domain information of the nodes. Because the layer domain information of a node indicate the position of the node in the network, the LSP may be calculated based on the layer domain information of the nodes and the rule with which the LSP should comply, thereby preventing the calculated LSP from passing the access layer. In the technical solution provided by the application, the LSP may be calculated without manual intervention, thereby realizing an automatic calculation of the LSP. In addition, the LSPs calculated based on the foregoing rules are separated completely. Thus, when the main and standby LSPs are created by use of the foregoing multiple LSPs, it may be guaranteed that the status of the standby LSP may not be affected by a failure at any link or node in the main LSP, thereby realizing the end-to-end protection in the real sense.

Figure 3:
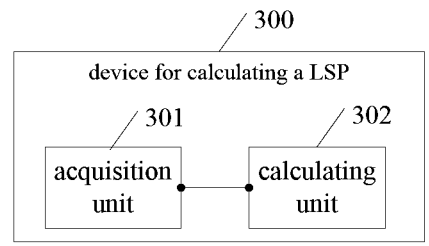
FIG. 3 is a structure schematic diagram of a device for calculating a LSP according to an embodiment of the application.

A device for calculating a LSP is provided according to an embodiment of the application. Referring to FIG. 3, a device 300 for calculating a LSP includes:

An acquisition unit 301, configured to acquire layer domain information of nodes in an autonomous system where a source node in a network is located.

The layer domain information of each node includes: information of a layer rank of the node and information of a domain value of the node. In the network, each node is provided with a layer rank and at least one domain value. Nodes in one network layer have a same layer rank. The lower the level of the network layer where the node is located, the higher the layer rank of the node may be. All nodes in one network physical coverage area have a same domain value, and the nodes in different network physical coverage areas have different domain values.

In an implementation, the acquisition unit 301 is configured to acquire the layer domain information of the nodes via an ISIS protocol message flooded by the nodes in an autonomous system where the source node in the network is located.

In another implementation, the acquisition unit 301 is configured to acquire the layer domain information of the nodes via an OSPF protocol message flooded by the nodes in an autonomous system where the source node in the network is located.

A calculating unit 302, configured to calculate a LSP from the source node to a destination node based on the layer domain information of the each node acquired by the acquisition unit 301 to create the LSP based on the calculated LSP, when the destination node and the source node are in the same autonomous system. The rule of calculating, by the device for calculating the LSP, the LSP from the source node to the destination node may include: a. when there is a first kind of path or a second kind of path in the process of the calculation of the LSP, prioritizing to exclude the two kinds of path, where the node in the first kind of path have the layer ranks from high to low to high, and the nodes in the second kind of path have the layer ranks from low to high to low; b. in the process of the calculation of the LSP, when a currently calculated node is in an overlapping area of multiple network physical coverage areas, prioritizing to determinate a node in a network physical coverage area where a previous calculated node is not located, as a next hop node of the currently calculated node.

Figure 4:
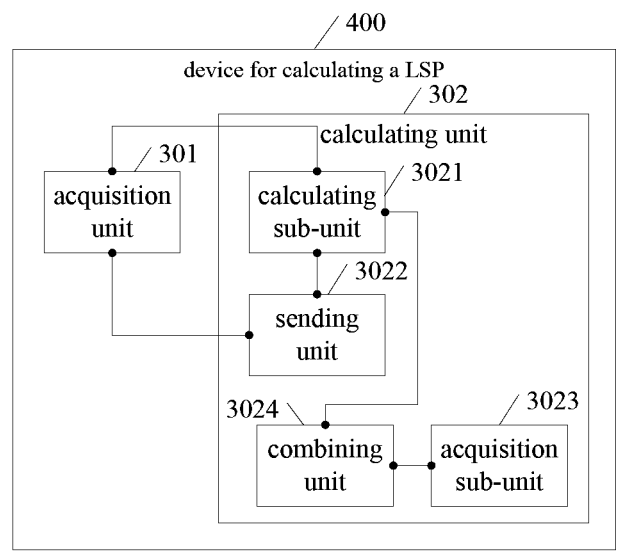
FIG. 4 is a structure schematic diagram of a device for calculating a LSP according to another embodiment of the application.

In an implementation, when the source node and the destination node are in different autonomous systems, a device 400 for calculating the LSP shown in FIG. 4, which is based on the device 300 according to an embodiment shown in FIG. 3, is provided according to an embodiment of the application. In the device 400, the acquisition unit 301 is still configured to acquire the layer domain information of the destination node. Specifically, the acquisition unit 301 may acquire the layer domain information of the destination node from a received LDP or BGP message. The calculating unit 302 includes a calculating sub-unit 3021, a sending unit 3022, an acquisition sub-unit 3023 and a combining unit 3024. The calculating sub-unit 3021 is configured to calculate a first section from the source node to an intermediate node in LSP based on the layer domain information of the nodes acquired by the acquisition unit 301, where the intermediate node is located in an overlapping area of the autonomous system where the source node is located and the autonomous system where the destination node is located. The sending unit 3022 is configured to send to the intermediate node the layer domain information of the destination node acquired by the acquisition unit 301, and the layer domain information of nodes in the first section of the LSP, where the layer domain information of nodes in the first section of the LSP is calculated by the calculating sub-unit 3021. The intermediate node may calculate a second section from the intermediate node to the destination node in LSP based on the layer domain information of the destination node and layer domain information of nodes in the first section of the LSP. In an implementation, the sending unit 3022 may send to the intermediate node, via an extended RSVP-TE message, the layer domain information of the destination node and the layer domain information of the nodes in the first section of the LSP. The acquisition sub-unit 3023 is configured to acquire, from the intermediate node, indication information of the second section of the LSP, where the indication information of the second section of the LSP includes the layer domain information of the nodes in the second section of the LSP. In an implementation, the intermediate node may send the indication information of the path to the device for calculating the LSP via the extended RSVP-TE message. Then, the device for calculating the LSP may acquire the indication information of the second section of LSP from the RSVP-TE message. The combining unit 3024 is configured to obtain the LSP from the source node to the destination node, based on the second section of LSP indicated by the indication information of the second section of the LSP and the first section of LSP calculated by the calculating sub-unit 3021, where the indication information of the second section of the LSP is acquired by the acquisition sub-unit 3023.

Figure 5:
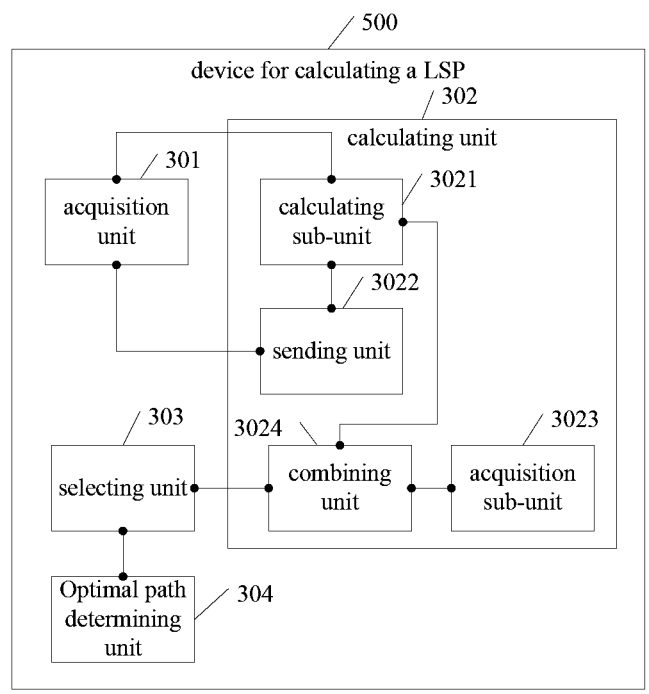
FIG. 5 is a structure schematic diagram of a device for calculating a LSP according to yet another embodiment of the application.

In an implementation, a standby LSP is created to implement an end-to-end protection. In an optimal main and standby protection solution, the main LSP is completely separated from the standby LSP. The complete separation of the main and standby LSPs includes the separation of the links and the separation of nodes. In this way, it may be guaranteed that the status of the standby LSP may not be affected by a failure at any link or node in the main LSP, thereby implementing the end-to-end protection in the real sense. Therefore, based on the embodiment shown in FIG. 3 or FIG. 4, the device for calculating the LSP further includes: a selecting unit and an optimal path determining unit. As shown in FIG. 5, a device 500 for calculating the LSP is provided based on the embodiment shown in FIG. 4. In the device 500, a selecting unit 303 is configured to select, from the more than two LSPs, the LSP which passes the fewest network layers, when the calculating unit 302 obtains more than two calculated LSPs. The optimal path determining unit 304 is configured to determine the LSP which passes the fewest network layers as an optimal LSP from the source node to the destination node, when the selecting unit 303 selects only one LSP which passes the fewest network layers. The optimal path determining unit 304 is further configured to, when the selecting unit 303 selects more than one LSP which passes the fewest network layers, compare, based on an ascending order of the levels of the network layers, the number of the nodes of the more than one LSP in each network layer, where the more than one LSP passes the fewest network layers, and then determine the LSP which passes the fewest nodes in one network layer as a main LSP from the source node to the destination node. In addition, the optimal path determining unit 304 may also determine a main LSP from multiple LSPs in other manners. For example, the optimal path determining unit 304 may also compare, based on a descending order of the levels of the network layers, the numbers of the nodes of the LSPs in each network layer, where the LSPs pass the fewest network layers; and then determine the LSP which passes the fewest nodes in one network layer, as the main LSP. Alternatively, the optimal path determining unit 304 may also determine the main LSP from the multiple calculated LSPs based on the traffic of the nodes of the LSPs. Alternatively, the optimal path determining unit 304 may also select a LSP randomly as the main LSP, which will not be limited herein.

In an embodiment of the application, the device for calculating the LSP may be integrated into the source node, or be independent to the source node, which will not be limited herein.

It may be noted that, the devices 300, 400 and 500 for calculating the LSP according to the embodiments of the application may be the device for calculating the LSP as described according to the method embodiments, which may be used to implement all the technical solutions in the foregoing method embodiments, where the functional modules may be configured to implement the method according to the foregoing method embodiments. The description in the foregoing embodiments may provide a reference for the implementation of the functions of the function modules, the detailed description of which will be omitted herein.

In an embodiment of the application, by planning the layer ranks and the domain values of the nodes in the network, the device for calculating the LSP may calculate the LSP based on the acquired layer domain information of the nodes. Because the layer domain information of a node indicate the position of the node in the network, the LSP may be calculated based on the layer domain information of the nodes and the rule with which the LSP should comply, thereby avoiding the calculated LSP from passing the access layer. In the technical solution provided by the application, the LSP may be calculated without manual intervention, thereby implementing an automatic calculation of the LSP. In addition, the LSPs calculated based on the foregoing rules are separated completely. Thus, when the main and standby LSPs are created by use of the foregoing multiple LSPs, it may be guaranteed that the status of the standby LSP may not be affected by a failure at any link or node in the main LSP, thereby implementing the end-to-end protection in the real sense.

A computer storage medium is provided according to an embodiment of the application, where the compute storage medium stores programs including a few or all of the method for calculating the LSP described in the foregoing method embodiments.

Figure 6:
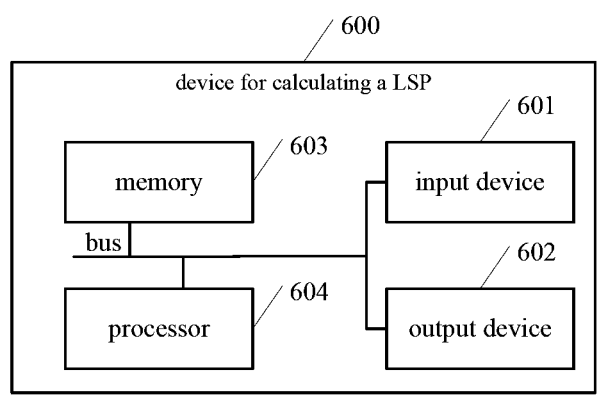
FIG. 6 is a structure schematic diagram of a device for calculating a LSP according to yet another embodiment of the application.

Another device for calculating a LSP is provided according to an embodiment of the application. As shown in FIG. 6, a device 600 for calculating a LSP is provided according to an embodiment of the application. The device 600 including:

an input device 601, an output device 602, a memory 603 and a processor 604 (the device 600 for calculating LSP may include one or more processors 604, taking one processor for an example in FIG. 6). In an embodiment of the application, the input device 601, the output device 602, the memory 603 and the processor 604 may be connected via a bus or in a other ways. As shown in FIG. 6, the output device 602, the memory 603 and the processor 604 may be connected via a bus.

The processor 604 executes the following process including two steps. The first step is to acquire layer domain information of all nodes in an autonomous system where a source node in a network is located, where the layer domain information of the node includes: information of a layer rank of the node and information of a domain value of the node. In the network, each node is provided with a layer rank and at least one domain value. Nodes in one network layer have a same layer rank; the lower the level of the network layer where the node is located, the higher the layer rank of the node may be. All nodes within one network physical coverage area have a same domain value, and the nodes in different network physical coverage areas have different domain values. The second step is to calculate a LSP from the source node to a destination node based on the layer domain information of the each node, to create the LSP based on the calculated LSP, when the destination node and the source node are in the same autonomous system. The LSP from the source node to the destination node may be calculated based on two rules. If there is a first kind of path or a second kind of path in the process of the calculation of the LSP, the two kinds of path may be prioritized to be excluded, where nodes in the first kind of path have layer ranks from high to low to high, and nodes in the second kind of path have layer ranks from low to high to low. In the process of the calculation of the LSP, when a currently calculated node is located in an overlapping area of multiple network physical coverage areas, a node in the network physical coverage area where a previous calculated node is not located may be prioritized to be determined to be a next hop node for the currently calculated node.

In an implementation, after being allocated with the layer ranks and domain values, the nodes in the network may flood their local layer domain information in their autonomous system. Thus, each node in its autonomous system may learn the layer domain information of other nodes, where the layer domain information includes the foregoing layer ranks and domain values. In an embodiment of the application, the device 600 for calculating the LSP and the source node are located in the same autonomous system (for the convenience of description, the autonomous system including the device 600 for calculating the LSP and the source node is called a source area). Thus, the device 600 for calculating the LSP may acquire the layer domain information flooded by the nodes in the source area. Furthermore, after acquiring the layer domain information flooded by the nodes in the source area, the device 600 for calculating the LSP may generate a path database including the layer domain information of all nodes in the source area and store the database into the memory 603, to conveniently call the layer domain information in the process of the creation of the LSP. In an application scenario, intermediate system-to-intermediate system (ISIS) protocol and open shortest path first (OSPF) protocol may be extended as needed. For example, for ISIS protocol, the layer domain information may be transmitted by means of extending sub-TLVs of a CAPABILITY TLV presented in the RFC4971 (the TLV herein refers to a variable format including three fields of type, length and value). For the OSPF protocol, the layer domain information may be transmitted by means of extending a TLV in a Router Information (RI) Opaque LSA presented in the RFC 4971. In this way, the processor 604 may acquire the layer domain information of all nodes in the source area, via an ISIS protocol message or an OSPF protocol message flooded by the nodes in the source area in the network.

In an implementation, a standby LSP is created to realize an end-to-end protection. In an optimal main and standby protection solution, the main LSP is completely separated from the standby LSP. The complete separation of the main and standby LSPs includes the separation of the links and the separation of nodes. In this way, it may be guaranteed that the status of the standby LSP may not be affected by a failure at any link or node in the main LSP, thereby implementing the end-to-end protection in the real sense.

In some embodiments, if the processor 604 obtains multiple calculated LSPs from the source node to the destination node, the processor 604 may select an optimal LSP from the multiple calculated LSPs as the main LSP, and take the rest LSP as the standby LSP. The method of determining the optimal LSP from the multiple LSPs may include: selecting, from the more than two LSPs, the LSP which passes the fewest network layers. If there is only one selected LSP which passes the fewest network layers, the only LSP may be selected as an optimal LSP from the source node to the destination node. If there is more than one selected LSP which passes the fewest network layers, the numbers of the nodes of the multiple LSPs in each network layer may be compared based on an ascending order of the levels of the network layers, where the multiple LSPs pass the fewest network layers; and then the LSP which passes the fewest nodes in one network layer may be determined to be the main LSP from the source node to the destination node. In addition, the processor 604 may also determine a main LSP from multiple LSPs in other ways. For example, the processor 604 may further compare, based on a descending order of the levels of the network layers, the numbers of the nodes of the LSPs in each network layer, where the LSPs pass the fewest network layers; and then the LSP which passes the fewest nodes in one network layer may be determined to be the main LSP. Alternatively, the processor 604 may also determine the main LSP from the multiple calculated LSPs based on the traffic of the nodes of the LSP. Alternatively, the processor 604 may further select a LSP randomly as the main LSP, which will not be limited herein.

In an embodiment of the application, the device 600 for calculating the LSP may be integrated to the source node, or be independent to the source node, which will not be limited herein.

It may be noted that, the device 600 for calculating the LSP may be the device for calculating the LSP according to the method embodiments, which may be used to implement all the technical solutions in the method embodiments, where the functional modules thereof may be configured to implement the method provided according to the foregoing method embodiments. The description in the foregoing embodiments may provide a reference for the implementation of the functions of the function modules, detailed description of which will be omitted herein.

It may be noted that, the method embodiments set forth are described as the combinations of a series of actions for the convenience of description. Those skilled in the art may understand that the application is not limited in the sequence of these actions, and the certain steps may be performed in other sequence or be performed simultaneously based on the description of the application. In addition, those skilled in the art may further understand that the embodiments described in the specification are only the preferable embodiments, and the relevant actions and modules may be unnecessary for the application.

The descriptions in the foregoing embodiments focus on different aspects, which may provide references for each other.

Those skilled in the art may understand that a few or all of the steps in the methods provided according to the foregoing embodiments may be implemented by instructing hardware via a programs, where the program may be stored in a computer-readable storage medium, and the storage medium may include, for example, a read-only memory, a random access memory, a disk or an optical disk.

The method and device for calculating the LSP are specified hereinbefore, and the variations of the implementation and application scope of the application may be made by those skilled in the art based on the principle of the application. In general, the specification is not a limitation of the application.

What is claimed is:

1. A method for calculating a label switching path LSP), comprising:
   acquiring layer domain information of one or more nodes in an autonomous system where a source node in a network is located, wherein, for each of the one or more nodes, the layer domain information of the node comprises information of a layer rank of the node and information of a domain value of the node; wherein in the network, each node has a layer rank and at least one domain value; wherein nodes in one network layer have a same layer rank, and a node in a low level of the network layer has a higher layer rank than a node in a high level of the network layer; wherein nodes in one network physical coverage area have a same domain value, and nodes in different network physical coverage areas have different domain values; and
   when a destination node and the source node are in a same autonomous system, calculating a LSP from the source node to the destination node based on the layer domain information of each of the one or more nodes, to create the LSP based on the calculated LSP, wherein the calculating the LSP from the source node to the destination node comprises:
      when there is a first kind of path or a second kind of path in the process of the calculation of the LSP, prioritizing to exclude the two kinds of paths, wherein nodes in the first kind of path have layer ranks from high to low to high, and nodes in the second kind of path have layer ranks from low to high to low; and
      when a currently calculated node is located in an overlapping area of multiple network physical coverage areas in the process of the calculation of the LSP, prioritizing to determine a node in a network physical coverage area where a previous calculated node is not located, as a next hop node of the currently calculated node.

2. The method according to claim 1, wherein the destination node and the source node are in different autonomous systems, the method further comprising:
   acquiring layer domain information of the destination node; and
   calculating the LSP from the source node to the destination node based on the layer domain information of each of the one or more nodes and the layer domain information of the destination node;
   wherein the calculating the LSP from the source node to the destination node based on the layer domain information of the each of the one or more nodes and the layer domain information of the destination node comprises:
      calculating a first section from the source node to an intermediate node in the LSP based on the layer domain information of each of the one or more nodes, wherein the intermediate node is located in an overlapping area of an autonomous system where the source node is located and an autonomous system where the destination nodes is located;
      sending, to the intermediate node, the layer domain information of the destination node and the layer domain information of nodes in the first section of the LSP, wherein the intermediate node calculates a second section from the intermediate node to the destination node in the LSP based on the layer domain information of the destination node and the layer domain information of nodes in the first section of the LSP;
      acquiring, from the intermediate node, indication information of the second section of the LSP, wherein the indication information of the second section of the LSP comprises the layer domain information of nodes in the second section of LSP; and
      obtaining the LSP from the source node to the destination node, based on the first section of the LSP and the indication information of the second sections of the LSP.

3. The method according to claim 2, wherein the acquiring the layer domain information of the destination node comprises:
   acquiring the layer domain information of the destination node via a received label distribution protocol (LDP) message or a received border gateway protocol (BGP) message.

4. The method according to claim 2, wherein the sending, to the intermediate node, the layer domain information of the destination node and the layer domain information of nodes in the first section of the LSP comprises:
   sending to the intermediate node, via an extended resource reservation protocol-traffic engineering message, the layer domain information of the destination node and the layer domain information of nodes in the first section of the LSP; and
   wherein the acquiring, from the intermediate node, indication information of the second section of the LSP comprises:
      acquiring the indication information of the second section of the LSP from the extended resource reservation protocol-traffic engineering message returned by the intermediate node.

5. The method according to claim 1, wherein, for each of the one or more nodes, the acquiring layer domain information comprises:
   acquiring the layer domain information of the node, via an intermediate system to intermediate system protocol message flooded by the node in the autonomous system where the source node in the network is located; or
   acquiring the layer domain information of the node, via an open shortest path first protocol message flooded by the node in the autonomous system where the source node in the network is located.

6. The method according to claim 1, wherein after the calculating the LSP from the source node to the destination node, the method further comprises:
   when there are more than two LSPs, selecting a LSP which passes the fewest network layers, from the more than two LSPs;

determining the LSP which passes the fewest network layers, as an optimal LSP from the source node to the destination node, when there is one selected LSP which passes the fewest network layers;

when there is more than one selected LSP which passes the fewest network layers, comparing, based on an ascending order of the levels of the network layers, the numbers of the nodes of the LSPs at each network layer, wherein the LSPs pass the fewest network layers; and determining a LSP which passes the fewest nodes in one network layer, as a main LSP from the source node to the destination node.

7. A device for calculating a label switching path (LSP), comprising:

an acquisition unit, configured to acquire layer domain information of one or more nodes in an autonomous system where a source node in a network is located, wherein, for each of the one or more nodes, the layer domain information of the node comprises information of a layer rank of the node and information of a domain value of the node; wherein in the network, each node has a layer rank and at least one domain value; wherein nodes in one network layer have a same layer rank, and a node in a low level of the network layer has a higher layer rank than a node in a high level of the network layer; wherein nodes within one network physical coverage area have a same domain value, and nodes in different network physical coverage areas have different domain values; and a calculating unit, configured to calculate a LSP from the source node to a destination node based on the layer domain information of the one or more nodes acquired by the acquisition unit, to create the LSP based on the calculated LSP, when the destination node and the source node are in a same autonomous system, wherein the calculating the LSP from the source node to the destination node comprises:

when there is a first kind of path or a second kind of path in the process of the calculation of the LSP, prioritizing to exclude the two kinds of paths, wherein nodes in the first kind of path have layer ranks from high to low to high, and nodes in the second kind of path have layer ranks from low to high to low; and when a currently calculated node is located in an overlapping area of multiple network physical coverage areas in the process of the calculation of the LSP, prioritizing to determine a node in a network physical coverage area where a previous calculated node is not located, as a next hop node of the currently calculated node.

8. The device for calculating the LSP according to claim 7, wherein:

the acquisition unit is further configured to acquire the layer domain information of the destination node, and the calculating unit comprises:

a calculating sub-unit configured to calculate a first section from the source node to an intermediate node in the LSP based on the layer domain information of the each of the one or more nodes acquired by the acquisition unit, wherein the intermediate node is located in an overlapping area of an autonomous system where the source is located and an autonomous system where the destination node is located;

a sending unit configured to send to the intermediate node, the layer domain information of the destination node acquired by the acquisition unit and the layer domain information of nodes in the first section of the LSP, wherein the intermediate node calculates a second section from the intermediate node to the destination node in the LSP based on the layer domain information of the destination node and the layer domain information of nodes in the first section of the LSP;

an acquisition sub-unit configured to acquire, from the intermediate node, indication information of the second section of the LSP, wherein the indication information of the second section of the LSP comprises the layer domain information of nodes in the second section of the LSP; and a combining unit configured to obtain the LSP from the source node to the destination node based on the indication information of the second section of the LSP acquired by the acquisition sub-unit and the first section of the LSP calculated by the calculating sub-unit.

9. The device for calculating the LSP according to claim 8, wherein the acquisition unit is configured to acquire the layer domain information of the destination node from a received label distribution protocol (LDP) or a received border gateway protocol (BGP) message.

10. The device for calculating the LSP according to claim 8, wherein the sending unit is configured to send to the intermediate node, via an extended resource reservation protocol-traffic engineering message, the layer domain information of the destination node acquired by the acquisition unit and the layer domain information of nodes in the first section of the LSP; and the acquisition unit is configured to acquire the indication information of the second section of the LSP from the extended resource reservation protocol-traffic engineering message returned by the intermediate node.

11. The device for calculating the LSP according to claim 7, wherein, for each of the one or more nodes:

the acquisition unit is configured to acquire the layer domain information of the node from an intermediate system to intermediate system protocol message flooded by the each in the autonomous system where the source node in the network is located; or the acquisition unit is configured to acquire the layer domain information of the node from an open shortest path first protocol message flooded by nodes in the autonomous system where the source node in the network is located.

12. The device for calculating the LSP according to claim 7, further comprising:

a selecting unit configured to, when there are more than two LSPs, select a LSP which passes the fewest network layers, from the more than two LSPs; and an optimal path determining unit configured to determine the LSP which passes the fewest network layers as an optimal LSP from the source node to the destination node, when there is one selected LSP which passes the fewest network layers; when there are more than one selected LSP which passes the fewest network layers, compare, based on an ascending order of the levels of the network layers, the numbers of the nodes of the LSPs in each network layer, where the LSPs pass the fewest network layers; and determine the LSP which passes the fewest nodes in one network layer, as the main LSP from the source node to the destination node.

* * * * *